(12) United States Patent
Pirskanen et al.

(10) Patent No.: US 11,856,649 B2
(45) Date of Patent: Dec. 26, 2023

(54) ADDRESSING SYSTEM FOR A WIRELESS COMMUNICATION NETWORK

(71) Applicant: WIREPAS OY, Tampere (FI)

(72) Inventors: Juho Pirskanen, Kangasala (FI); Ville Kaseva, Tampere (FI)

(73) Assignee: Wirepas Oy, Tampere (FI)

( * ) Notice: Subject to any disclaimer, the term of this patent is extended or adjusted under 35 U.S.C. 154(b) by 0 days.

(21) Appl. No.: 17/190,677

(22) Filed: Mar. 3, 2021

(65) Prior Publication Data

US 2021/0282004 A1    Sep. 9, 2021

(30) Foreign Application Priority Data

Mar. 4, 2020    (FI) .................................... 20205231

(51) Int. Cl.
*H04W 4/00*    (2018.01)
*H04W 8/26*    (2009.01)

(52) U.S. Cl.
CPC .................................... *H04W 8/26* (2013.01)

(58) Field of Classification Search
CPC ...................................................... H04W 8/26
USPC ......................................................... 370/328
See application file for complete search history.

(56) References Cited

U.S. PATENT DOCUMENTS

| | | | |
|---|---|---|---|
| 9,300,581 B1 | 3/2016 | Hui et al. | |
| 2001/0055311 A1* | 12/2001 | Trachewsky | H04L 1/0003 370/445 |
| 2003/0063619 A1* | 4/2003 | Montano | H04L 61/00 370/443 |
| 2005/0220063 A1* | 10/2005 | Hong | H04L 12/4604 370/389 |
| 2006/0120317 A1 | 6/2006 | Zheng | |
| 2007/0226502 A1* | 9/2007 | Tenny | H04L 63/126 713/170 |

(Continued)

FOREIGN PATENT DOCUMENTS

| | | |
|---|---|---|
| EP | 2430819 B1 | 3/2019 |
| GB | 2411317 A | 8/2005 |

OTHER PUBLICATIONS

European Patent Office, European Search Report of EP 21160144, dated Jun. 10, 2021, 2 pages.

(Continued)

*Primary Examiner* — Mark G. Pannell
(74) *Attorney, Agent, or Firm* — Meunier Carlin & Curfman LLC

(57) ABSTRACT

The application relates to an addressing system for a wireless communication network. The system comprises a first communication device and a second communication device. The first and second communication devices belong to a group of plurality of communication devices of the network. Each communication device is configured to provide a bi-directional radio communication with at least one of the plurality of communication devices. Each communication device has a long node identifier (L-ID) for addressing said communication device and for being used in at least one security procedure of communication in the network. Each communication device is configured to generate a short node identifier (S-ID) for identifying said communication device in a dedicated communication between it and other communication device belonging to the plurality of communication devices.

13 Claims, 2 Drawing Sheets

(56) References Cited

U.S. PATENT DOCUMENTS

| | | | |
|---|---|---|---|
| 2008/0250160 A1 | 10/2008 | Hall | |
| 2008/0259895 A1* | 10/2008 | Habetha | H04W 28/26 |
| | | | 370/347 |
| 2009/0135762 A1 | 5/2009 | Veillette | |
| 2013/0089092 A1* | 4/2013 | Dai | H04L 61/2596 |
| | | | 370/389 |
| 2016/0135041 A1* | 5/2016 | Lee | H04L 45/745 |
| | | | 726/3 |
| 2017/0013153 A1* | 1/2017 | Shin | G06F 3/1203 |
| 2019/0095403 A1* | 3/2019 | Parhar | H04L 67/131 |
| 2019/0357123 A1* | 11/2019 | Jha | H04L 1/1671 |
| 2019/0387459 A1* | 12/2019 | McCann | H04W 8/265 |
| 2020/0244655 A1* | 7/2020 | Gundavelli | H04L 63/0876 |

OTHER PUBLICATIONS

Anonymous, High Rate Ultra Wideband PHY and MAC Standard, Dec. 1, 2008, retrieved from <https://www.ecma-international.org/wp-content/uploads/ECMA-368_3rd_edition_december_2008.pdf>, pp. 1-344.

Search Report for Finnish Application No. 20205231 dated Sep. 28, 2020.

ETSI TR 103 635 V1.1.1 (Nov. 2019). Digital enhanced Cordless Telecommunications (DECT); DECT-2020 New Radio (NR) interface; Study on MAC and higher layers. Nov. 15, 2019.

Wirepas OY. ETSI Draft; DECT(20)000071r1: On Radio Device (RD) identities and association in DECT-2020. Mar. 23, 2020.

\* cited by examiner

ADDRESSING SYSTEM FOR A WIRELESS COMMUNICATION NETWORK

CROSS-REFERENCE TO RELATED APPLICATIONS

This application claims priority to, and the benefit of, Finnish Patent Application No. 20205231, filed Mar. 4, 2020, which is incorporated by reference herein in its entirety.

TECHNICAL FIELD

The application relates generally to an addressing system for a wireless communication network.

BACKGROUND

A node identity (ID) is used to identify a transmitter of data as well as a receiver of data in any radio technology that requires a frequent signalling of node identities in packet transmissions. The node ID, which is set as a receiver ID of data packet, is used to separate transmissions at the receiver from each other, i.e. the receiver should act only on messages intendent for it. The node ID, which is set as a transmitter ID of data packet, is used to identify the transmitter so that the receiver can perform correct actions towards the transmitter.

In wireless communication systems, such as Bluetooth Low Energy (BLE) networks and Wireless Local Area networks (WLAN), e.g. Wi-Fi networks, where different devices can independently access to a channel and transmit packets, there is need to include both receiver ID and transmitter ID into each packet transmission.

The node ID needs to be long enough, i.e. number of bits, to provide at least a local uniqueness of transmitter and receiver, which is transmitted in every packet transmission. This can be e.g. 32 or 48 bits, where 48 bits can already provide global uniqueness with $2^{48}$ addresses.

The BLE system uses 48 bits-long receiver and transmitter IDs (addresses) in a Medium Access Control (MAC) header of packet after a Physical layer (PHY) header of packet. In a WLAN (Wi-Fi) system, for one, each packet contains a Basic service set (BSS) ID as well as 48 bits-long transmitter and receiver IDs that are in its MAC header. This leads to a very brute-forced packet solution where each transmission in the WLAN system contains the 48 bits-long BSS ID, 48 bits-long receiver MAC address, and 48 bits-long transmitter MAC address.

Such bit sequence for the receiver and transmitter IDs at each packet transmission is considerable amount of overhead, especially, when data transmissions are sufficiently small, which can be the case in Internet of Things (IoT) operation. For example, if a data amount, transmitted by an IoT device as single data burst, is 32 bytes, resulting that if it is used 32-48 bits both receiver and transmitter IDs in each of the packet transmission, these IDs introduce 25%-37.5% overhead.

SUMMARY

One object of the invention is to withdraw drawbacks of known solutions and to provide an addressing system for a wireless communication network, wherein its communication devices can allocate short node identifiers for them with distributed scheme and with minimum signalling, and avoid any central allocation and coordination, and still support a Hybrid automatic-repeat request (HARQ) operation.

One object of the invention is fulfilled by providing an addressing system, communication device, methods, computer program, and computer-readable medium according to the independent claims.

Embodiments of the invention are disclosed in the independent claims.

One embodiment of the invention is an addressing system for a wireless communication network. The system comprises a first communication device and a second communication device. The first and second communication devices belong to a group of plurality of communication devices of the network. Each communication device is configured to provide a bi-directional radio communication with at least one of the plurality of communication devices. Each communication device has a long node identifier for addressing said communication device and for being used in at least one security procedure of communication in the network. Each communication device is configured to generate a short node identifier for identifying said communication device in a dedicated communication between it and other communication device belonging to the plurality of communication devices. Each communication device is configured to include at least its generated short node identifier as a transmitter address into a control part of a communication packet for informing the transmitter of the communication packet to its receiver, and at least its long node identity into another part of the communication packet for securing a security of theirs communication.

One embodiment of the invention is an addressing method for a wireless communication network. The method comprises a following step of presenting at least first and second communication devices belonging to a group of a plurality of communication devices of the network. The method further comprises a following step of presenting, by each communication device, a long node identifier in order to address said communication device and to use it in at least one security procedure of communication in the network. The method further comprises a following step of generating, by each communication device, a short node identifier in order to identify said communication device in a dedicated communication between it and other communication device belonging to the plurality of communication devices. The method further comprises a following step of including, by each communication device, at least its generated short node identifier as a transmitter address into a control part of a communication packet in order to inform the transmitter of the communication packet to its receiver, and at least its long node identity into another part of the communication packet in order to secure a security of theirs bidirectional radio communication.

One embodiment of the invention is a wireless communication device for a wireless communication network. The device comprises a controller part and a data transfer part. The data transfer part is configured to provide a bi-directional radio communication with at least one another wireless communication device. The controller part is configured to present a long node identifier for addressing said communication device and for being used in at least one security procedure of communication in a wireless communication network. The controller part is configured to generate a short node identifier for identifying said communication device in a dedicated communication between it and other communication device of the network. The controller part is configured to include at least its generated short node identifier as a transmitter address into a control part of a communication packet for informing the transmitter of the communication packet to its receiver, and at least its long node identity into another part of the communication packet for securing a security of communication.

One embodiment of the invention is an addressing method for a wireless communication device. The method comprises a following step of providing, by a data transfer part of the communication device, a bi-directional radio communication with at least one another wireless communication device. The method further comprises a following step of presenting, by a controller part of the communication device, a long node identifier in order to address said communication device and to use it in at least one security procedure of communication in a wireless communication network. The method further comprises a following step of generating, by the controller part, a short node identifier in order to identify said communication device in a dedicated communication between it and other communication device of the network. The method further comprises a following step of including, by the controller part, at least its generated short node identifier as a transmitter address into a control part of a communication packet in order to inform the transmitter of the communication packet to its receiver, and at least its long node identity into another part of the communication packet in order to secure a security of communication.

One embodiment of the invention is a computer program that comprises instructions, which, when the program is executed by a computer, which is in accordance with the previous device embodiment, cause the computer to carry out at least the steps of the previous method embodiment.

One embodiment of the invention is a tangible, non-volatile computer-readable storage medium that comprises the computer program, which is in accordance with the previous computer program embodiment.

Further embodiments of the invention are disclosed in the dependent claims.

BRIEF DESCRIPTION OF THE FIGURES

The exemplary embodiments of the invention are described with reference to the accompanying figures.

DETAILED DESCRIPTION OF THE FIGURES

Figure 1:
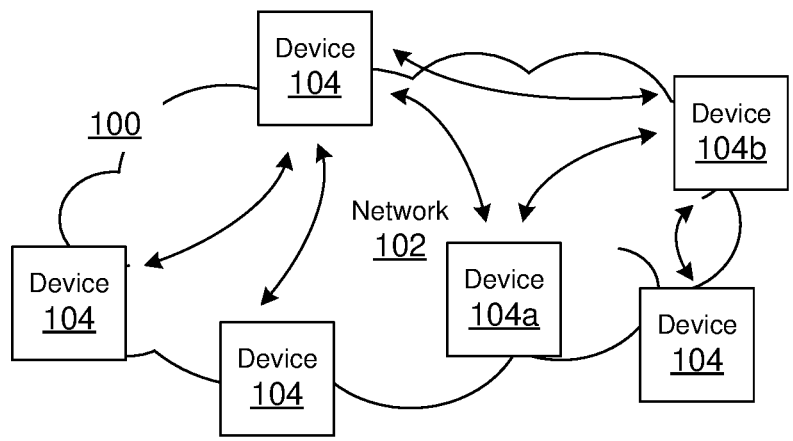
FIG. 1 presents a wireless communication environment for an addressing system

FIG. 1 presents an environment, wherein an addressing system 100 may be applied.

The environment comprises a wireless communication network (system) 102, which comprises a plurality of wireless communication devices (nodes) 104, 104a, 104b. The devices 104, 104a, 104b operate on a same spectrum at a same geographical area, e.g. within the example environment. The usage of same spectrum enable a bi-directional communication is between the devices 104, 104a, 104b, i.e. radio transmissions transmitted by one device 104, 104a, 104b of network 102 may be received by another device 104, 104a, 104b of network 102 and vice versa.

The system 100 may be applied to any wireless communication network 102 that uses frequent signaling of node identifiers (identities, IDs) in packet transmissions. Preferably, the system 100 may be applied in wireless communication networks 102 complying DECT (Digital European Cordless Telecommunications)-2020 standard. Some non-limiting examples to which the system 100 may be applied may comprise, but is not limited to, BLE mesh network, Thread network, Zigbee network, Public Land Mobile Network (PLMN), WLAN network, cellular network, or wireless mesh network, e.g. wireless sensor network, and/or any other wireless networks.

Typically, the devices 104, 104a, 104b of the network 102 are capable to receive transmissions with one radio technology, e.g. BLE transmissions or WLAN transmissions, which transmissions are all from the same network 102. However, at least one of the devices 104, 104a, 104b of network 102 may be capable to receive transmissions with at least two radio technologies, e.g. BLE transmissions and WLAN transmissions, which transmissions are all from the same network 102.

The DECT-2020 is radio access technology developed by ETSI. The DECT-2020 supports massive machine-type communication (mMTC) and ultra-reliable low latency communication (URLLC). On Physical (PHY) layer, the key technology components of the DECT-2020 are Orthogonal frequency-division multiplexing (OFDM), adaptive modulation and coding schemes (MCS), Modern Channel coding methods (Turbo, LDPC, Convolutional coding), HARQ for both scheduled and contention based transmissions, and a support of multi-antenna transmissions with different Multiple-Input and Multiple-Output (MIMO) streams. On Medium access (MAC) layer and from system aspects, the key technology components of the DECT-2020 are a support of high number of IoT sensors, actuators, and other industrial applications; support of Mesh network topology, support of URLLC communication with very short delay (typical application may be wireless microphones); operation on frequencies that are license exempt; and support of multiple overlapping non-coordinated networks with cognitive radio capabilities to share spectrum resources between multiple networks.

Figure 2A:
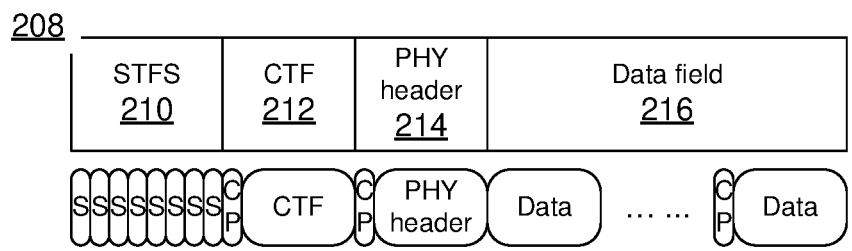
FIG. 2a presents an example format of packet

FIG. 2a presents an example format of packet 208 that is used in the system 100. The system 100 is not limited to this packet format and, naturally, any other format may be used.

The packet 208 may be, but is not limited to, a PHY layer packet 208 as presented in the figure.

The format of packet 208 comprises fields of Synchronization Training Field Symbols (STFS) 210, channel training field (CTF) 212, PHY header field, i.e. PHY control field (part), 214, and data field 216. The STFS field 210 is used to provide time and frequency synchronization for the receiving device 104, 104a, 104b and, additionally, it may be used to other purposes, such as adjusting gain of the receiving device 104, 104a, 104b. The CTF field 212 is used for channel estimation purposes in the receiving device 104, 104a, 104b. The header field 214 is used to transmit necessary information how the data field 216 is transmitted. The header field 214 may comprise, but is not limited to, information used Modulation and coding scheme (MCS), a network address (identity, identifier, ID) a receiver address (identity, identifier, ID), a transmitter address (identity, identifier, ID), a transmission power used to transmit the packet 208, a HARQ process number, a new data indicator, a redundancy version of the packet 208 and/or a HARQ feedback information. The data field 216 comprises at least one MAC protocol data unit (PDU) and it is the field that is re-transmitted in a HARQ operation.

The header field 214 comprise identification information, i.e. a transmitter identifier, representing (identifying) the transmitter (transmitting device) 104, 104a, 104b. Alternatively, or additionally, the header field 214 may further comprise identification information, i.e. a receiver identifier, representing (identifying) the receiver (receiving device) 104, 104a, 104b. The header field 214 may be protected with Cyclic Redundant Check (CRC) so that receiving device 104, 104a, 104b may ensure that reception of the header field 214 was correct. The length of the CRC in the header field 214 may be e.g. 8 or 16 bits.

The length of the header field 214 may be 26-120 bits, even though other lengths of header field 214 are possible. Preferably, the length of header field 214 may be approx. 50-80 bits and it may depend on the format of the packet 208. Alternatively, or additionally, the length of header field 214 may depend on whether the CTF field may be used to transfer control channel bits or not. Above, it is discussed about the length of header field 214, but the same applies also to the header field 214 of the packet 208, if the packet 208 is packet of any other layer.

Figure 2B:
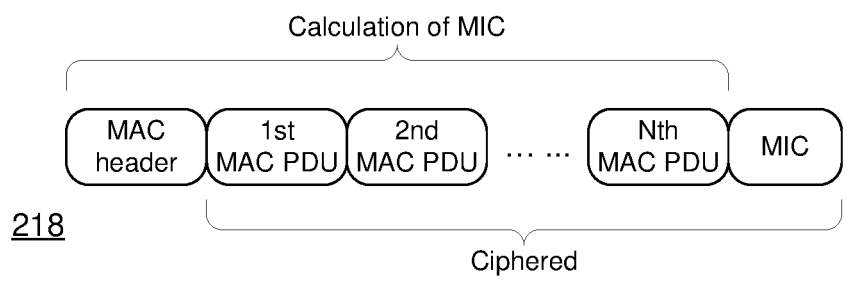
FIG. 2b presents an example of MAC PDU structure

FIG. 2b presents an example of a MAC PDU structure 218 that is used in the system 100. The system 100 is not limited to this structure and any structure may be used.

The MAC PDU structure 218 comprises, a MAC header field, and at least one parts of MAC PDU data. The MAC header field is used to indicate the content of the MAC PDU data to the receiving device 104, 104a, 104b as well as convey necessary parameters of a MAC level security (when used). The MAC level security is expected to cipher all other fields of the MAC PDU expect the MAC header field, whereas an integrity protection may be provided with a message integrity code (MIC) from the complete MAC PDU and added to end of the MAC PDU.

Figure 3:
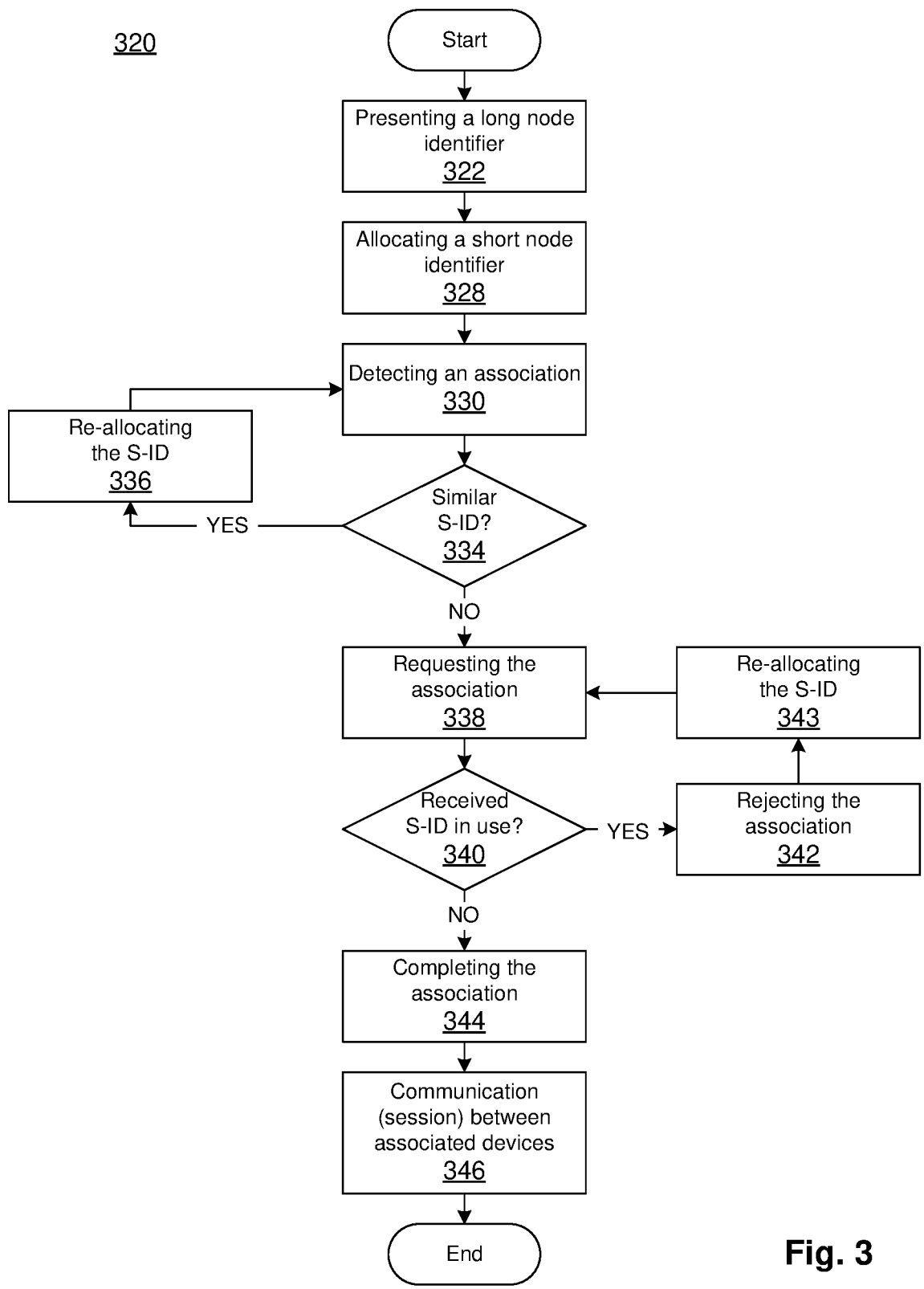
FIG. 3 presents a flowchart of addressing method

FIG. 3 presents how an addressing method 320 is used in the transmissions of previously described packets 208, and how devices 104, 104a, 104b operate in the previously described system and network 100, 102.

The method 320 is described mainly by using two devices 104a, 104b, i.e. a first device 104a and a second device 104b, both belonging to the same network 102, which may also comprise a plurality of other devices 104.

At a step 322, each device 104, 104a, 104b of the network 102 presents, by means of its controller part 424, a long node identifier (long ID, long address) L-ID, which may be e.g. 32-48 bits long identifier, e.g. a 48-bits Ethernet MAC address used in Wi-Fi networks. The presented L-ID is globally unique, or unique at least in the network 102, wherein the device 104, 104a, 104b operates or prefers to operate.

Each device 104, 104a, 104b is able to provide, by means of its data transfer part 426, the bi-directional radio communication with at least one other device 104, 104a, 104b, i.e. to transmit at least one data packet 208 to other device(s) 104, 104a, 104b and to receive at least one data packet 208 from the other device(s) 104, 104a, 104b, in the network 102 as previously has been described. In other words, each device 104, 104a, 104b may act as a transmitter and/or as a receiver.

In the method 320, the device 104a is acting as a transmitter and the device 104b is acting as receiver at the start and these roles change between the devices 104a, 104b during their mutual communication. Preferably, the transmitter and the receiver devices 104, 104a, 104b may be identical with each other. However, the invention is not limited to that.

This presented L-ID of each 104, 104a, 104b identifies (address) the device 104, 104a, 104b from other devices 104, 104a, 104b, which operate in the network 102, and it is used in at least one security procedure, e.g. in the ciphering and/or integrity protection, of communicated data in the network 102.

At a step 328, each device 104, 104a, 104b generates (allocates), by means of its controller part 424, when it intends to initiate an association with other device 104, 104a, 104b in the network 102 in order to communicate with it or with the network 102 in order to join it, a random short node identifier (short ID, short ad-dress)S-ID, which may be e.g. 8-32 bits long identifier. The S-ID is generated so that it is shorter than the L-ID, which means that it comprises fewer bits than the L-ID. The S-ID may be e.g. 8, 16, 24, or 32 bits long, but in the DECT-2020, it is preferably 16 or 24 bits long.

The generated S-ID of each 104, 104a, 104b identifies and differentiates the device 104, 104a, 104b from other devices 104, 104a, 104b in a dedicated communication (association), e.g. a unique packet transmission, between two devices 104, 104a, 104b in the network 102.

When each device 104, 104a, 104b has its L-ID and one of devices 104, 104a, 104b, which is in this example a device 104a, wants to initiate an association with at least one other device 104, 104b in the network 102 and to communicate with it, the device 104a generates the random S-ID for itself.

At a step 330, the device 104a determines a beacon packet 208. It includes, by means of its controller part 424, the generated S-ID as a transmitter address into a control part (field) 214, e.g. a PHY control field, of beacon packet 208 to be broadcasted and its L-ID as a plain text into another part (field), e.g. data field 216, of beacon packet 208 in order to secure the packet 208. The beacon packet 208 is broadcasted to all devices 104, 104b or a certain group of devices 104, 104b in the network 102, whereupon this is also indicated in the control part 214 (as a "receiver address"). A rest of packet 208 may be ciphered and integrity protected or sent as a plain text. Then, the device 104a starts to broadcast, by means of its data transfer part 426, the generated beacon packet 208 to which has been included both the S-ID and L-ID as an intention to associate with other device(s) 104, 104b.

The usage of 8-32 bits long S-ID reduces the overhead of transmission at the control part 214 of packets 208. Especially, in packets 208 using substantially short slots, the overhead of control part 214 may be minimized in order to use the short slots efficiently for application layer data. For example, the DECT-2020 supports 1.728 MHz channel bandwidth with 27 kHz subcarrier spacing with only slot length of 10 ms/24=0.41666 ms, i.e. a packet (frame) time is 10 ms and the packet is split into 24 time slots.

When the device 104a broadcasts its beacon packet 208, it may detect, by means of its data transfer part 426, the environment at the same time in order to listen a radio communication of the other devices 104, 104b and to receive beacon packets 208 from the other device(s) 104, 104b similarly as these other devices 104, 104a operate. During these operations, it detects, by means of its controller part 424, S-IDs included into a control part 214 of detected communication packets 208 and records (stores) the detected S-IDs, by means of its controller part 424, into its memory part 432.

Each of other devices 104, 104b also operate similarly, i.e. those listen the radio communication of the other devices 104, 104a in the network 102 and checks, by means of the controller part 424, whether any of detected S-IDs of the other devices 104, 104a is similar to its own S-ID.

At a step 334, when one of the other devices 104, 104b, which is in this example a device 104b, receives, by means of its data transfer part 426, the broadcasted beacon packet 208 from the device 104a, it detects, by means of the controller part 424, the S-ID of device 104a from the control part 214 of received beacon packet 208, and checks, by means of its controller part 424, whether the included S-ID of device 104a is similar to its own S-ID or to any other recorded S-ID, which the device 104b already knows.

At a step 336, if such coincidence exists, i.e. the device 104b detects that the received S-ID of device 104a is similar to its S-ID, the device 104b re-generates (reallocates) a new S-ID for itself similarly as described in the step 328 and returns to listen its environment.

At a step 338, if such coincidence does not exist, the device 104b, which also has now detected the L-ID of device 104a from the data part 216 of beacon packet 208 and which intends to associate to the device 104a, determines, by means of its controller part 424, an association request packet 208. The device 104b includes its S-ID as a transmitter address and the S-ID of device 104a as a receiver address into a control part 214 of association request packet 208. The device 104b also includes at least its L-ID as a plain text into another part, e.g. a data part 216, of association request packet 208. A rest of packet 208 is ciphered and integrity protected. The device 104b may also include the L-ID of device 104a into the data part 216. Then, after the determination of association request packet 208, the device 104b transmits (an unicast transmission), by means of its data transfer part 426, it to device 104a.

At a step 340, when the device 104a receives, by means of its data transfer part 426, the association request packet 208 from the device 104b, it detects, by means of the controller part 424, the S-ID of device 104b from the control part 214 of received association request packet 208 and checks, by means of the controller part 424, whether the included S-ID of device 104b is similar to its own S-ID or to any other recorded S-ID, which the device 104a already knows.

At a step 342, if such coincidence exists, i.e. the device 104a detects that the received S-ID of device 104b is similar to its or some other recorded S-ID, the device 104a determines, by means of its controller part 424, an association non-acknowledged (NACK) response packet 208. The device 104a includes its S-ID as a transmitter address and the S-ID of device 104b as a receiver address into a control part 214 of NACK response packet 208, and, then, transmits, by the data transfer part 426, the NACK response packet 208 to the device 104b.

At a step 343, after the device 104b has received the NACK response packet 208, the device 104b re-generates a new S-ID for itself similarly as described in the steps 328, 336, and returns to determine a new association request packet 208 by means of its new S-ID and re-transmit it similarly as described in the step 338.

At a step 344, if such coincidence does not exist, the device 104a, which also has now detected the L-ID of device 104b from the data part 216 of association request packet 208 and intends to associate with the device 104b, determines, by means of its controller part 424, an association acknowledged (ACK) response packet 208. The device 104a includes its S-ID as a transmitter address and the S-ID of device 104b as a receiver address into a control part 214 of ACK response packet 208, and, then, transmits, by the data transfer part 426, the ACK response packet 208 to the device 104b in order to complete the association. The device 104a may also include at least one of the L-IDs of devices 104a, 104b into another part, e.g. a data part 216, of ACK response packet 208.

The previously-described association signalling between the devices 104a, 104b is used to exchange the relation of L-ID and S-ID, whereupon the HARQ operation is enabled at link layer with the S-ID as well as the ciphering and integrity protection with using the L-ID.

At a step 346, after the completion of association, before the device 104a receives a data packet 208 from the device 104b, the device 104b includes its S-ID in the control part 214 of data packet 208 as a transmitter address and the S-ID of device 104a as receiver address. The security procedures of data packet 208 are done by using the L-ID of the device 104b or using the L-IDs of both devices 104a, 104b. The device 104b performs the security procedures by using the L-ID of device 104b in chipering mask and integrity protection calculations (calculation of MIC), but it may not include the L-ID of either device 104b or device 104a.

When the device 104a receives the data packet 208, the device 104a uses the S-ID of device 104b obtained from the control part 214 of data packet 208 to obtain the correct L-ID of device 104b and it performs an unciphering and integrity protection check by using the L-ID of device 104b, or by using the L-IDs of both devices 104a, 104b. The device 104b has obtained the correct S-ID-to-L-ID relation information at the association-completed step 344 as previously has been described.

The roles of devices 104a, 104b may naturally be vice versa.

Without the correct S-ID-to-L-ID relation information the integrity protection fails and the data packet 208 is discarded. Thus, the transmission of L-IDs over radio interface is avoided. Even if other communication pair of devices 104 uses the same S-IDs than the devices 104a and 104b, and 104b receives such a data packet, the data will not be incorrectly forwarded to higher layers.

The communication between the devices 104a, 104b by packet transmissions exists as long as the association has not terminated. The termination may be performed by a termination packet 208 that terminates the association or it may occur when the communication between the devices 104a, 104b has been suspended for some reason, e.g. due to a lack of communication during a predetermined time period.

The generation of S-IDs provides the system 100, where each device 104, 104a, 104b has two independent identifiers when the L-ID provides network wide uniqueness and the S-ID provides local link-level uniqueness in its radio neighborhood. The L-ID is used as a basis of link layer security procedures, e.g. ciphering and integrity protection, and in mesh network operations for packet routing.

Figure 4:
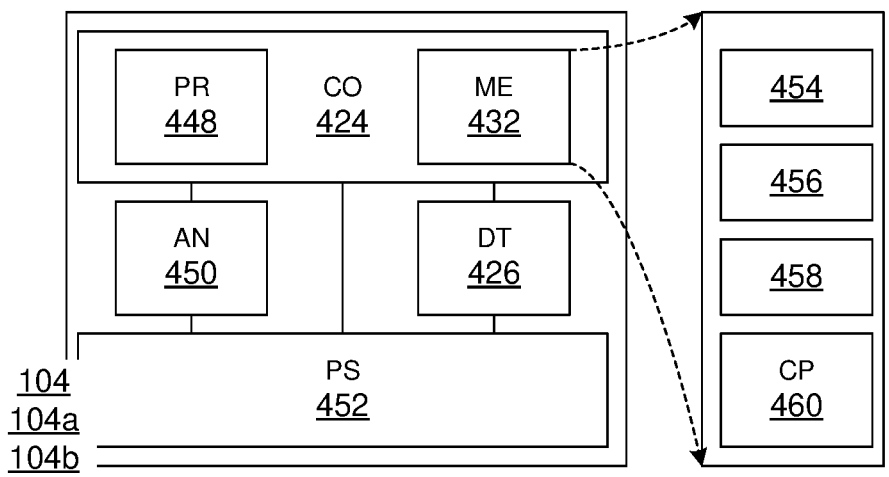
FIG. 4 presents parts of wireless communication device

FIG. 4 presents a device 104, 104a, 104b that is able to communicate in the network 102 and to perform the addressing method 320.

The device 104, 104a, 104b comprises the controller (control) part 424 that controls operations of its parts 426, 432, 448, 450, 452 so that the device 104, 104a, 104b operates as described in the context of previous figures.

The controller part 424 comprises a processor part 448 that performs operator-initiated and/or computer program-initiated instructions, and processes data in order to run applications. The processor part 448 may comprise at least one processor, e.g. one, two, three, or more processors.

The controller part 424 also comprises the memory part 432 in order to store and to maintain data. The data may be instructions, computer programs, and data files. The memory part 432 comprises at least one memory, e.g. one, two, three, or more memories.

The device 104, 104a, 104b also comprises the data transfer part 426 and an antenna part 450 that the controller part 424 uses in order to send commands, requests, and data to at least one of entities in the system 100, e.g. devices 104, 104, 104b, via the antenna part 450. The data transfer part 426 also receives commands, requests, and data from at least one of entities in the system 100, e.g. devices 104, 104, 104b, via the antenna part 450. The communication between the data transfer part 426 of device 104, 104, 104b and other entities in the system 100 is provided through the antenna part 450 wirelessly.

The device 104, 104a, 104b also comprises a power supply part 452. The power supply part 452 comprises components for powering the device 104, 104a, 104b, e.g. a battery and a regulator.

The memory part 432 stores at least a data transfer application 454 for operating (controlling) the data transfer part 426, an antenna application 456 for operating the antenna part 450, and a power supply application 458 for operating the power supply part 452.

The memory part 432 also stores a computer program 460 (software, application), which uses at least one of parts 426, 448, 450, 452 in order to perform at least the operations of device 104, 104a, 104b described previously in this description and figures, when it is run in a computer, e.g. in the device 104, 104a, 104b, by means of the controller part 424.

The computer program 460 may be stored in a tangible, non-volatile computer-readable storage medium, e.g. a Compact Disc (CD) or Universal Serial Bus (USB)-type storage device.

The invention has been described above with reference to the above-mentioned exemplary embodiments and its several advantages have been described. It is clear that the invention is not only restricted to these embodiments, but it comprises all possible embodiments within the scope of following claims.

The invention claimed is:

1. An addressing system for a wireless communication network, comprising
a first communication device and
a second communication device,
wherein the first and second communication devices belong to a group of a plurality of communication devices of the network,
wherein each communication device is configured to provide a bi-directional radio communication with at least one of the plurality of communication devices,
wherein each communication device has a long node identifier for addressing said communication device and for being used in at least one communication security procedure in the network,
wherein each communication device is configured to generate a short node identifier which has fewer bits than the long node identifier, without any central allocation and distribution in the network for identifying said communication device in a dedicated communication between it and another communication device belonging to the plurality of communication devices, and
wherein each communication device is further configured to include at least its generated short node identifier as a transmitter address into a control part of a communication packet for informing a receiver of the transmitter of the communication packet, and at least its long node identifier into another part of the communication packet for securing their communication.

2. The system according to claim 1, wherein the first communication device is configured to use its short node identifier as a transmitter address in a control part of a first packet and its long node identifier in another part of the first packet when determining the first packet as a beacon to be broadcasted to at least the second communication device.

3. The system according to claim 2, wherein the second communication device is configured to use its short node identifier as a transmitter address and the short node identifier of the first communication device as a receiver address in a control part of a second packet, and its long node identifier in another part of the second packet when determining the second packet to be transmitted as an association request to the first communication device.

4. The system according to claim 3, wherein the first communication device is configured to use its short node identifier as a transmitter address and the short node identifier of the second communication device as a receiver address in a control part of a third packet, and its long node identifier and the long node identifier of the second communication device in another part of the third packet when determining the third packet as an association acknowledgement response to be transmitted to the second communication device for completing an association of the first and second communication devices.

5. The system according to claim 3, wherein the first communication device is configured to check the control part of the second packet for detecting whether the short node identifier coincides with a short node identifier (S-ID) of another communication device, which it knows, and to use the short node identifier of the first communication device as a transmitter address and the short node identifier of the second communication device as a receiver address in a control part of a fourth packet for determining the fourth packet as an association non-acknowledgement response to be transmitted to the second communication device, if such coincidence exists.

6. The system according to claim 5, wherein the second device is configured to re-generate its short node identifier (S-ID), if it receives the fourth packet, and to re-determine the second packet by means of its re-generated short node identifier for its re-transmission as a new response to the first communication device.

7. The system according to claim 1, wherein the first and second communication devices, which have been associated, are configured to address communication packets to each other by means of their short node identifiers (S-IDs), which have been included into a control part of communication packets as transmitter and receiver addresses.

8. The system according to claim 1, wherein each communication device is configured to check each short node identifier (S-ID) from a control part of communication packets in the network for detecting whether a short node identifier (S-ID) of another communication device coincides with the generated short node identifier and to re-generate its short node identifier (S-ID), if such coincidence exists.

9. The system according to claim 1, wherein the network is Digital European Cordless Telecommunication DECT-220-based network, a wireless mesh network, a wireless Bluetooth Low Energy (BLE)-based radio network, a wireless local area network (WLAN), Thread network, Zigbee network, Public Land Mobile Network (PLMN), or cellular network.

10. An addressing method for a wireless communication network, comprising following steps of presenting at least first and second communication devices belonging to a group of a plurality of communication devices of the network, presenting, by each communication device, a long node identifier in order to address said communication device and to use it in at least one communication security procedure in the network, generating, by each communication device, a short node identifier, which has fewer bits than the long node identifier, without any central allocation and distribution in the network in order to identify said communication device in a dedicated communication between it and another communication device belonging to the plurality of communication devices, and including, by each communication device, at least its generated short node identifier as a transmitter address into a control part of a communication packet order to inform a receiver of the transmitter of the communication packet, and at least its long node identifier into another part of the communication packet in order to secure their bi-directional radio communication.

11. A wireless communication device, comprising:

a controller part and a transceiver, wherein the transceiver is configured to provide a bi-directional radio communication with at least one another wireless communication device, wherein the controller part is configured to present a long node identifier for addressing said communication device and for being used in at least one communication security procedure in a wireless communication network, wherein the controller part is configured to generate a short node identifier, which has fewer bits than the long node identifier, without any central allocation and distribution in the network for identifying said communication device in a dedicated communication between it and another-communication device of the network, and wherein the controller part is further configured to include at least its generated short node identifier as a transmitter address into a control part of a communication packet for informing a receiver of the transmitter of the communication packet, and at least its long node identifier into another part of the communication packet for securing their communication.

12. An addressing method for a wireless communication device, comprising following steps of providing, by a transceiver of the communication device, a bi-directional radio communication with at least one another wireless communication device, presenting, by a controller part of the communication device, a long node identifier in order to address said communication device and to use it in at least one communication security procedure in a wireless communication network, generating, by the controller part, a short node identifier, which has fewer bits than the long node identifier, without any central allocation and distribution in the network in order to identify said communication device in a dedicated communication between it and another communication device of the network, and including, by the controller part, at least its generated short node identifier as a transmitter address into a control part of a communication packet in order to inform a receiver of the transmitter of the communication packet, and at least its long node identifier into another part of the communication packet in order to secure their communication.

13. A tangible, non-transitory computer-readable storage medium comprising a computer program that comprises instructions, which, when the computer program is executed by a computer, cause the computer to carry out at least the steps of the method according to claim 12.

\* \* \* \* \*